US009532391B2

(12) United States Patent
Palin et al.

(10) Patent No.: US 9,532,391 B2
(45) Date of Patent: Dec. 27, 2016

(54) DEVICE SELECTION

(71) Applicant: NOKIA TECHNOLOGIES OY, Espoo (FI)

(72) Inventors: Arto Palin, Viiala (FI); Jukka Reunamäki, Tampere (FI); Juha Salokannel, Tampere (FI); Tommy Ginman, Masala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/824,422

(22) Filed: Aug. 12, 2015

(65) Prior Publication Data
US 2016/0073439 A1 Mar. 10, 2016

(30) Foreign Application Priority Data

Sep. 4, 2014 (EP) .................................... 14183570

(51) Int. Cl.
H04W 76/02 (2009.01)
H04W 4/00 (2009.01)
H04W 8/00 (2009.01)
H04W 68/02 (2009.01)
H04W 88/18 (2009.01)

(52) U.S. Cl.
CPC ........... *H04W 76/023* (2013.01); *H04W 4/008* (2013.01); *H04W 8/005* (2013.01); *H04W 68/02* (2013.01); *H04W 88/182* (2013.01)

(58) Field of Classification Search
CPC combination set(s) only.
See application file for complete search history.

(56) References Cited

U.S. PATENT DOCUMENTS

| 2011/0199918 | A1* | 8/2011 | Sampath | H04W 8/005 370/252 |
| 2011/0258313 | A1* | 10/2011 | Mallik | H04W 8/005 709/224 |
| 2014/0029471 | A1* | 1/2014 | Tavildar | H04W 48/16 370/255 |
| 2014/0355517 | A1* | 12/2014 | Reunamaki | H04W 8/005 370/328 |
| 2015/0327047 | A1* | 11/2015 | Tiirola | H04W 8/005 370/338 |

* cited by examiner

Primary Examiner — Junpeng Chen
(74) Attorney, Agent, or Firm — Locke Lord LLP

(57) ABSTRACT

A technique for wireless communication is provided. According to an example embodiment, the technique comprises carrying out a proximity-based device selection for a second device in response to receiving, from a first device, one or more control messages that indicate presence of said second device and invoking at least one of one or more predefined actions in dependence of identity of said second device in response to said proximity-based device selection having resulted in selecting said second device.

14 Claims, 8 Drawing Sheets

DEVICE SELECTION

TECHNICAL FIELD

The example and non-limiting embodiments of the present invention relate to device discovery and device selection in context of wireless communication.

BACKGROUND

Establishing a wireless connection between two devices, including e.g. steps of device discovery, device selection and connection setup is in many occasions a complicated operation. Multitude of different communication techniques, communication protocols and user-interface components for controlling use of these techniques/protocols may make it uncomfortable or even difficult for a user of a device to successfully perform the preparatory steps required for establishing a connection.

Automated or semi-automated techniques that enable device selection based on physical proximity of two devices have been proposed to facilitate user-friendly device selection and connection set-up and establishment. Such a device selection technique may be referred to as proximity-based device selection. If the proximity-based device selection is further followed by (automated) connection establishment, the procedure may be referred to as proximity-based connection establishment.

While proximity-based device selection and proximity-based connection establishment serve to significantly reduce the complexity of the connection establishment process, they still require either users of the to-be-connected devices to activate the functions that enable the automated procedures for device selection or connection establishment in the respective devices (thereby making the procedure, in a way, a semi-automated one) or requires the function that enables the automated procedures for device selection or connection establishment to be continuously activated. While the former approach provides limited user-friendliness, the latter solution may be problematic in power consumption point of view and it may also result involve security risks.

SUMMARY

According to an example embodiment, an apparatus for wireless communication is provided, the apparatus comprising means for receiving messages from other wireless communication devices, means for carrying out a proximity-based device selection, configured to initiate the proximity-based device selection for a second device in response to receiving, from a first device, one or more control messages that indicate presence of said second device, and means for invoking one or more predefined actions, configured to invoke at least one of said predefined actions in dependence of identity of said second device in response to said proximity-based device selection having resulted in selecting said second device.

According to another example embodiment, a method for wireless communication is provided, the method comprising carrying out a proximity-based device selection for a second device in response to receiving, from a first device, one or more control messages that indicate presence of said second device and invoking at least one of one or more predefined actions in dependence of identity of said second device in response to said proximity-based device selection having resulted in selecting said second device.

According to another example embodiment, a computer program comprising computer readable program code configured to cause performing at least the following when said program code is executed on a computing apparatus: carry out a proximity-based device selection for a second device in response to receiving, from a first device, one or more control messages that indicate presence of said second device and invoke at least one of one or more predefined actions in dependence of identity of said second device in response to said proximity-based device selection having resulted in selecting said second device.

The computer program referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

As an example of a proximity-based device selection technique, so-called touch-to-select (T2S) technique is briefly introduced in the following. The T2S technique may be employed to carry out device selection for establishment of a short-range wireless connection between two devices, referred to as a touching device and a touched device. In the T2S technique, a first device (e.g. the touching device) is brought to a close proximity of a second device (e.g. the touched device), resulting in an automated device selection and connection setup between the touching device and the touched device, possibly further followed by connection establishment between the two devices. The T2S technique involves applying, at least in one of the touching device and the touched device, a measure indicative of the strength of a signal originating from the other device as an indication of the other device being in a close enough proximity, e.g. in a touching distance or almost in a touching distance.

In the T2S technique, the device selection, i.e. the touching device detecting the presence of the touched device or vice versa in close enough proximity, is based on at least one of the devices transmitting packets according to applied communication protocol for reception by the other device. This enables the device receiving the packets to measure the signal strength and to determine whether the other device it in a close enough proximity. Consequently, if the measured signal strength exceeds a predefined threshold value, the other device is considered to be in close enough proximity and it can be selected for connection establishment, whereas in case the measured signal level fails to exceed the threshold value, the device refrains from selecting the other device for connection establishment. In context of the T2S technique, the measured signal strength may be represented e.g. by a received signal strength indication (RSSI) value, which RSSI value may be derived on basis of RSSI computed for one or more received packets or messages.

Figure 1:
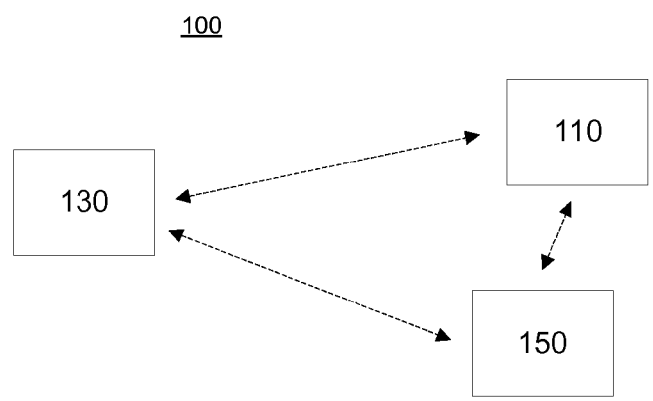
FIG. 1 schematically illustrates some components of a communication arrangement depicting a framework for some example embodiments.

FIG. 1 schematically illustrates some components and/or entities of a wireless communication arrangement 100 to depict an exemplifying framework for one or more embodiments of the present invention. In the communication arrangement 100 a first device 110 may be arranged to monitor a (geographical) area of interest to detect presence of a second device 130 where the third device 150 is operated in a state/mode where it is not discoverable by other devices. The detection of the presence of the second device 130 may be based on, for example, one or more messages received from the second device 130 over a wireless communication link.

The first device 110 is further arranged to transmit, in response to detection, one or more control messages to a third device 150 to indicate the presence of the second device 130. The one or more control messages may be conveyed via a wireless or wired communication link. The first device 110 may be further arranged to transmit, via a wireless communication link, one or more further control messages to the second device 130 to indicate the presence of the third device 150.

In response to receiving the respective control message (s), the second device 130 and/or the third device 150 may be arranged to invoke procedure(s) that enable carry out a proximity-based device selection, such as the T2S technique described in the foregoing, in one of the second device 130 and the third device 150 for selection of the other device 130, 150. In response to proximity-based device selection in one of the second device 130 and the third device 150 having resulted in selection of the other device 130, 150, the third device 150 may initiate or carry out one or more predefined actions that may depend on the identity of the second device 130.

The components of the communication arrangement 100 provide a non-limiting example that depicts a single second device 130 and a single third device 150 for clarity of illustration and for clarity and for brevity of description. However, in general there may be one or more second devices 130 and one or more third devices 150. In the following, the term second device 130, when used in the singular form, is applied to jointly refer to any of the one or more second devices 130 unless explicitly stated otherwise. Similarly, the term third device 150, when used in the singular form, is applied to jointly refer to any of the one or more third devices 150 unless explicitly stated otherwise.

The first device 110 is typically, but not necessarily, provided as a server device or as a component of a server device. Moreover, the first device 110 is typically provided as stationary device, in other words as a non-mobile device installed in its operating environment in a fixed manner. The first device 110 is typically capable of relying on availability of mains electricity and hence power consumption is not a critical issue.

Figure 2A:
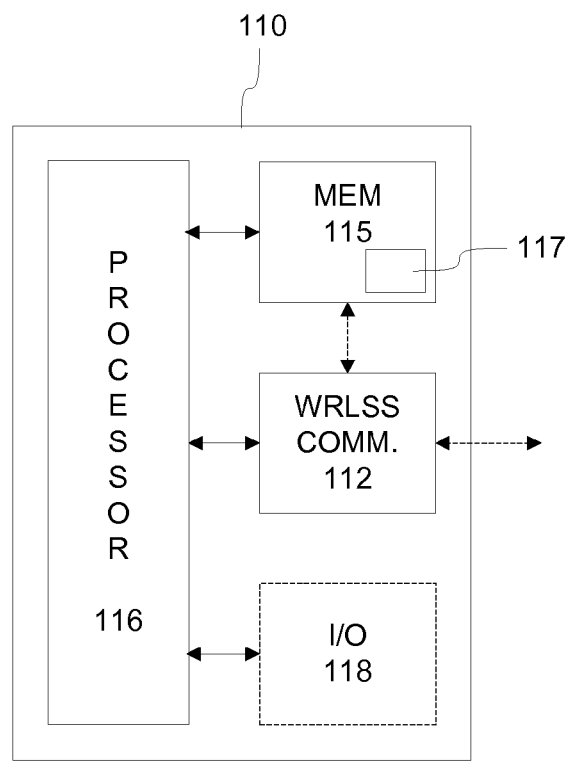
FIG. 2a schematically illustrates some components of a device according to an example embodiment.

FIG. 2a schematically illustrates some components of an exemplifying first device 110 that may be relevant for the description of some embodiments of the present invention. The first device 110 comprises a wireless communication portion 112 for wireless communication with other devices. The wireless communication portion 112 comprises one or more wireless communication apparatuses. A wireless communication apparatus of the wireless communication portion 112 may be also considered as a wireless communication means. A wireless communication apparatus of the wireless communication portion 112 may enable, for example, communication with other devices using a short-range wireless communication technique or protocol that provides a point-to-point wireless connection with another device. The first device 110 is hence capable of communicating with other devices that are equipped with communication apparatus using the same technique/protocol, e.g. with the second device 130 and/or with the third device 150.

The first device 110 further comprises a processor 116 and a memory 115 for storing data and computer program code 117. The first device 110 may further comprise user I/O (input/output) components 118 that may be arranged, possibly together with the processor 116 and a portion of the computer program code 117, to provide a user interface for receiving input from a user of the first device 110 and/or providing output to the user of the first device 110. The processor 116 may be arranged to control operation of the first device 110 e.g. in accordance with the computer program code 117 stored in the memory 115 and possibly further in accordance with the user input received via the user I/O components 118 and/or in accordance with information received via the wireless communication portion 112. The memory 115 and a portion of the computer program code 117 stored therein may be further arranged to, with the processor 116, to provide a control function for controlling operation of a wireless communication apparatus of the wireless communication portion 112, possibly together with a control portion or a control function that may be provided within the respective wireless communication apparatus (which will be described later in this text). The first device 110 may comprise further components or portions in addition to those depicted in FIG. 2a.

The second device 130 is typically a mobile user device, such as a mobile phone, a smartphone, a music player, a media player, a tablet computer, a portable navigation device, etc. As a further example, the second device 130 may be a special-purpose dedicated for serving as a device that is applied to enable invocation of one or more predefined actions associated therewith.

Figure 2B:
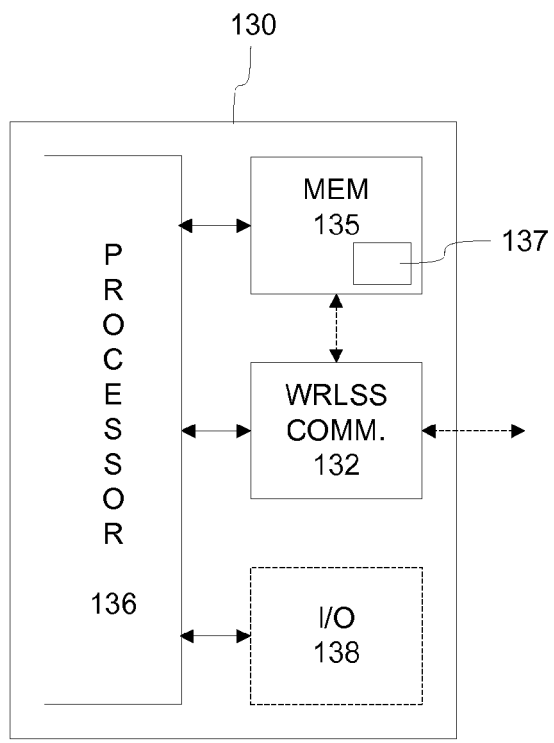
FIG. 2b schematically illustrates some components of a device according to an example embodiment.

FIG. 2b schematically illustrates some components of an exemplifying second device 130 that may be relevant for the description of some embodiments of the present invention. The second device 130 comprises a wireless communication portion 132 similar to the wireless communication portion 112. Hence, a wireless communication apparatus of the wireless communication portion 132 may, for example, enable the short-range wireless communication with the first device 110, with the third device 150 and/or with other devices equipped with communication means using the same technique/protocol.

The second device 130 further comprises a processor 136 and a memory 135 for storing data and computer program code 137. The second device 130 may further comprise user I/O (input/output) components 138 that may be arranged, together with the processor 136 and a portion of the computer program code 137, to provide a user interface for receiving input from a user of the second device 130 and/or providing output to the user of the second device 130. The processor 136 may be arranged to control operation of the second device 130 in accordance with the computer program code 137 stored in the memory 135 and possibly further in accordance with the user input received via the user I/O components 138 and/or in accordance with information received via the wireless communication portion 132. The memory 135 and a portion of the computer program code 137 stored therein may be further arranged, with the processor 136, to provide a control function for controlling operation of a wireless communication apparatus of the wireless communication portion 132, possibly together with a control portion of a control function that may be provided within the respective wireless communication apparatus (which will be described later in this text). The second device 130 may comprise further components or portions in addition to those depicted in FIG. 2b.

The third device 150 is typically, but not necessarily, provided as a special-purpose device or as a component of such a device. As an example, the third device 150 may be arranged to carry out a specific control task associated with its physical environment, such as control of access to physical spaces. Moreover, the third device 150 is typically provided as stationary device, in other words as a non-mobile device installed in its operating environment in a fixed manner. Although provided as a stationary device, the third device 150 is typically a battery-powered device where low power consumption is an advantage.

Figure 2C:
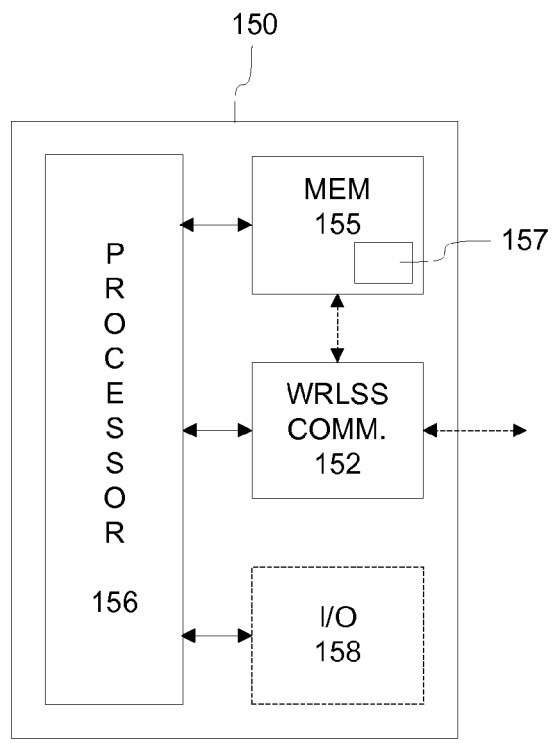
FIG. 2c schematically illustrates some components of a device according to an example embodiment.

FIG. 2c schematically illustrates some components of an exemplifying third device 150 that may be relevant for the description of some embodiments of the present invention. The third device 150 comprises a wireless communication portion 152 similar to the wireless communication portions 112 and 132. Hence, a wireless communication apparatus of the wireless communication portion 152 may, for example, enable the short-range wireless communication with the first device 110, with the second device 130 and/or with other devices equipped with communication means using the same technique/protocol.

The third device 150 further comprises a processor 156 and a memory 155 for storing data and computer program code 157. The third device 150 may further comprise user I/O (input/output) components 158 that may be arranged, together with the processor 156 and a portion of the computer program code 157, to provide a user interface for receiving input from a user of the third device 150 and/or providing output to the user of the third device 150. The processor 156 may be arranged to control operation of the third device 150 in accordance with the computer program code 157 stored in the memory 155 and possibly further in accordance with the user input received via the user I/O components 158 and/or in accordance with information received via the wireless communication portion 152. The memory 155 and a portion of the computer program code 157 stored therein may be further arranged, with the processor 156, to provide a control function for controlling operation of a wireless communication apparatus of the wireless communication portion 152, possibly together with a control portion of a control function that may be provided within the respective wireless communication apparatus (which will be described later in this text). The third device 150 may comprise further components or portions in addition to those depicted in FIG. 2c.

As described in the foregoing, each of the wireless communication portions 112, 132, 152 comprises one or more respective wireless communication apparatuses. A wireless communication apparatus may be provided e.g. as a respective chipset and/or as a respective communication module. For clarity and brevity of description, each wireless communication apparatus comprised in the wireless communication portion 112, 132, 152 may be considered as a single logical entity that may also be capable of processing at least some of the information received via the wireless connection and/or at least some of the information that is to be transmitted via the wireless connection without external control from other components of the respective device 110, 130, 150 (e.g. from the processor 116, 136, 156, respectively). In an embodiment, a communication apparatus of the wireless communication portion 112, 132, 152 comprises e.g. a wireless transceiver portion for wireless communication and a control portion (or a control function) for controlling operation of the respective wireless transceiver portion and for processing information received/transmitted via the respective wireless transceiver portion. Such a control function may be provided by hardware means, by software means or by a combination of hardware means and software means. As an example in this regard, the wireless communication apparatus may comprise a memory and a processor, and a computer program code stored in the memory may be arranged to, with the processor, provide the control function for controlling operation of the respective wireless communication apparatus either independently or jointly with the control function provided by the memory 115, 135, 155, the computer program 117, 137, 157 and the processor 116, 136, 156 of the respective device 110, 130, 150.

The third device 150 may be installed in close proximity of the first device 110 to ensure that when the first device 110 detects the presence of the second device 130 it is highly likely that the second device 130 is also within the operating range of the wireless communication portion 152 of the third device 150. Depending on the operating range and other characteristics of the applied communication apparatus of the wireless communication portion 152 (and hence the respective wireless communication apparatus of the wireless communication portion 132), installation in the close proximity may include installing the first device 110 and the third device 150 e.g. in the same space (e.g. in the same room), in adjacent spaces (e.g. in the adjacent rooms), in the same building, etc. Consequently, the first device 110 may be arranged to carry out the device discovery in order to detect one of one or more predefined devices (e.g. the second device 130) and possibly also to carry out some operations related to device selection and/or connection establishment on behalf of the third device 150.

As an example scenario within the framework of the communication arrangement 100, the first device 110 may constitute or be a component of a control arrangement that is powered by mains electricity and where the power consumption is hence typically not a critical issue, whereas the third device 150 may be e.g. a battery-operated entity arranged to invoke one or more predefined actions when the second device 130 is brought into close proximity. The second device 130 may be a (battery-operated) mobile user device.

Even though performance of the predefined action(s) is a consequence of the second device 130 being brought into close proximity of the third device 150, the first device 110 is arranged to serve as an intermediate device that monitors the presence of the second device 130 on behalf of the third device 150 while the third device 150 may be operated in the state/mode where its presence is not 'visible' to (e.g. it is not discoverable by) other devices. Making use of the first device 110 as the intermediate device may be employed to provide advantages in terms of improved security and in terms of reduced power consumption:

The first device 110 may be employed to obtain the identity of a detected device while still operating the third device 150 in the state/mode where is not 'visible' to other devices. This enables keeping the presence of the third device 150 hidden from devices other than predefined ones, thereby providing improved security.

The first device 110 may be employed to obtain the identity of a detected device while still operating the third device 150 in the state/mode where is not 'visible' to other devices and the third device 150 may be controlled to initiate the proximity-based device selection procedure only when one of predefined devices has been detected, thereby reducing power consumption in the third device 150 by carrying out the proximity-based device selection procedure only when needed.

The first device 110 monitoring the presence of other devices on behalf of the third device 150 enables operating the third device 150 in a power-saving mode until another device, e.g. one of predefined devices, has been detected in the proximity, thereby enabling reduced power consumption in the third device 150.

The wireless connection between the wireless communication portions 112 and 132, between the wireless communication portions 112 and 152 and/or between the wireless communication portions 132 and 152 may be provided by employing a suitable short-range wireless communication technique or protocol in a wireless communication apparatus of the respective wireless communication portions 112, 132, 152. The term short-range wireless communication as used herein refers to a wireless communication technique or protocol that enables typical operating range in the scale of tens of meters, e.g. up to 100 meters. However, especially in an indoor environment, the operating range of such short-range wireless communication technique/protocol may be significantly shorter e.g. due to walls and other stationary structures as well as furniture etc. that are likely to partially block or interfere with the radio communication between wireless communication portions. On the other hand, in favorable conditions in outdoor use the operating range may extend to several hundreds of meters.

Examples of such wireless techniques/protocols include the Bluetooth (BT) Basic Rate/Enhanced Data Rate (BR/EDR) and the Bluetooth Low Energy (BLE) protocols, both specified e.g. in the Bluetooth Specification Version 4.1, Covered Core Package version 4.1 (publication date 3 Dec. 2013), incorporated herein by reference in its entirety. In the following, this document is referred to as a Bluetooth Specification.

While a number of short-range wireless communication techniques/protocols known in the art are applicable in the framework of the communication arrangement 100, in the following some aspects of various embodiments of the present invention are described with references to the BT BR/EDR and BLE protocols. However, these protocols serve as illustrative and non-limiting examples in this regard, and the description generalizes into any wireless communication protocol.

Figure 3:
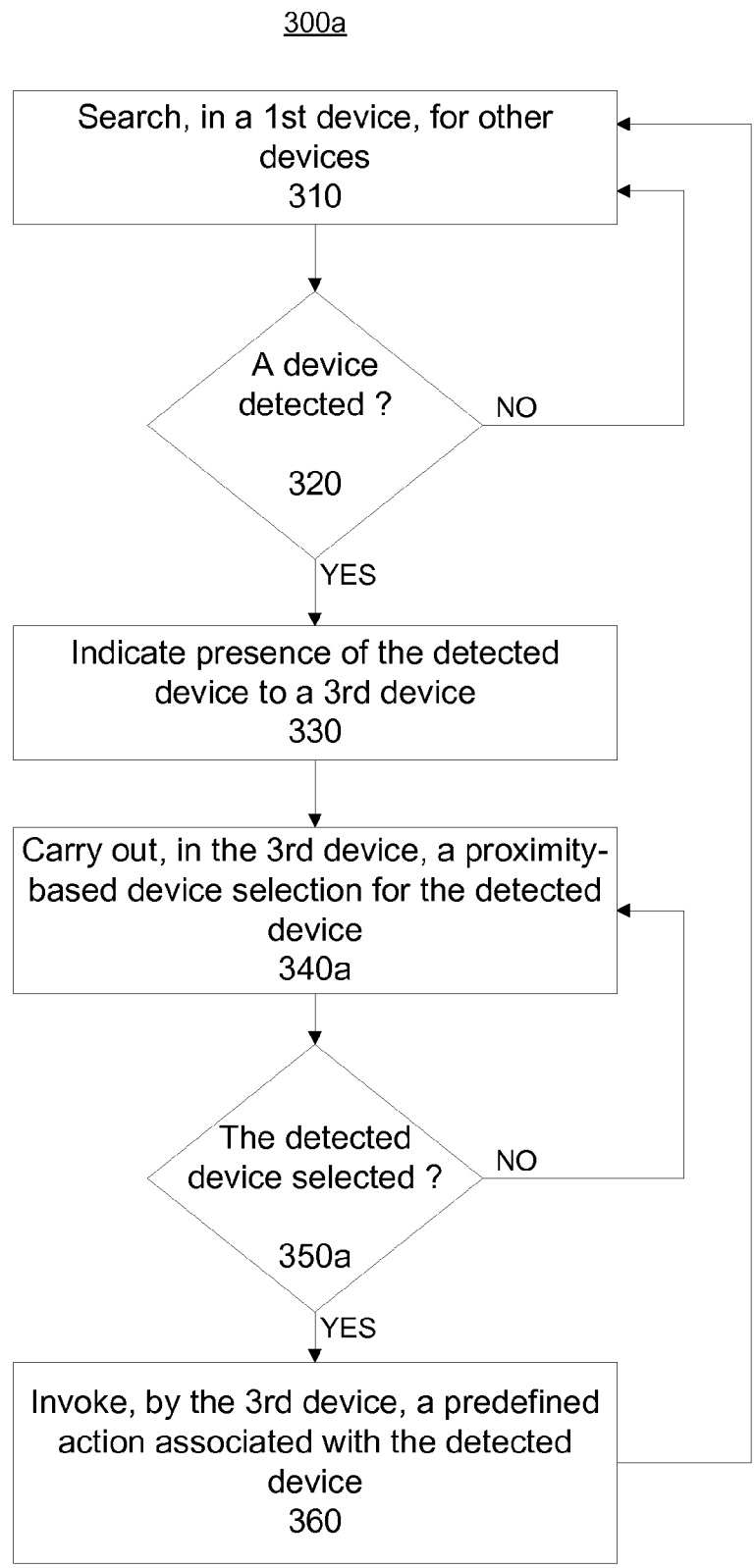
FIG. 3 illustrates a method according to an example embodiment.

FIG. 3 illustrates an exemplifying method 300a for invoking one or more predefined actions by the third device 150 in the framework of the communication arrangement 100.

The method 300a proceeds from the first device 110 causing a wireless communication apparatus of the wireless communication portion 112 to search for other wireless devices in the proximity, as indicated in block 310. As examples, the search may be carried out continuously or the search may be activated for a predefined period of time at predefined time intervals. To simplify the description, in the following it is assumed that the device possibly detected by the first device 110 is the second device 130. In parallel, the third device 150 is operating in the state/mode where it is not discoverable by other devices, e.g. it is not discoverable by the second device 130.

In response to detecting, in the first device 110, a presence of the second device 130, as indicated in block 320, the method 300a proceeds to the first device 110 indicating the presence of the second device 130 to the third device 150, as indicated in block 330. The indication procedure may comprise the first device 110 causing the wireless communication apparatus of the wireless communication portion 112 to establish or activate a wireless connection with the respective wireless communication apparatus in the third device 150 and to transmit, via this wireless connection, one or more control messages that serve as an indication of presence of the second device 130 having been detected by the first device 110. In context of block 330 the first device 110 may further use a wireless communication apparatus of the wireless communication portion 112 to transmit a message comprising a device identification assigned for the third device 130 to provide the second device 130 with an indication of the identity of the third device 150.

In response to the control message(s), the third device 150 causes a wireless communication apparatus of the wireless communication portion 152 to initiate and/or carry out a proximity-based device selection procedure, such as the T2S technique described in the foregoing, for selection of another device that is brought into close proximity of the third device 150. In particular, the proximity-based device selection may be employed for selection of the second device 130, as indicated in block 340a. Initiating the proximity-based device selection procedure may comprise, for example, the third device 150 causing the wireless communication apparatus of the wireless communication portion 152 to change from operating in the state/mode where it is not discoverable by other devices to a state/mode where it is discoverable by other devices. Carrying out the proximity-based device selection procedure may comprise, for example, the third device 150 receiving via the wireless communication apparatus of the wireless communication portion 152 one or more messages from the second device 130 and estimating the proximity of the second device 130 on basis of the received messages.

In response to the proximity-based device selection in the third device 150 having resulted in selecting the second device 130 (block 350a), the third device 150 invokes one or more predefined actions associated with the second device 130. In other words, at least one of one or more predefined actions is invoked, where the invoked action(s) is/are selected in dependence of identity of the second device 130. From block 360 the method 300a returns to block 310, i.e. the first device 110 continues searching for other wireless devices in the proximity.

In context of the method 300a, the operations described in blocks 320 to 350a may be varied in a number of ways within the framework of the method 300a. As an example, the method 300a may further involve screening of other devices on basis of identity indicated for the second device 130, e.g. by comparing the identity indicated for the detected second device 130 to one or more predefined device identities. The screening may be carried out on basis of a device identification assigned for a detected second device 130 in comparison to one or more predefined device identifications, e.g. in accordance with one of the following approaches.

- In block 320, the search comprises the first device 110 searching for any device. In the course of the search the first device 110 receives a device identification associated with the second device 130 (i.e. that of the device used herein as an example of the detected device), and the received device identification is included in the control message(s) transmitted from the first device 110. The third device 150 has device identifications of one or more predefined devices pre-stored therein and the third device 150 implements the screening by proceeding with the proximity-based device selection procedure (in block 340a) only in response to having determined that the device identification received in the control message(s) from the first device 110 matches one of the pre-stored device identifications available in the third device 150.
- In block 320, the search comprises the first device 110 searching for any device. The third device 150 has device identifications of one or more predefined devices pre-stored therein and the third device 150 proceeds with or completes the device selection (block 350a) only in response to having determined that a device identification received in the course of the proximity-based device selection procedure (block 340a) matches one of the pre-stored device identifications available in the third device 150.
- The first device 110 has device identifications of one or more predefined devices pre-stored therein, and in block 320 the search comprises the first device 110 searching for one of the predefined devices. Thus, the first device 110 hence implements the screening by proceeding with indicating the third device 150 regarding the presence of the second device 130 only in response to having determined that a device identifier of the second device 130 received in the course of the search (block 310) matches one of the pre-stored device identifications available in the first device 110.

Figure 4:
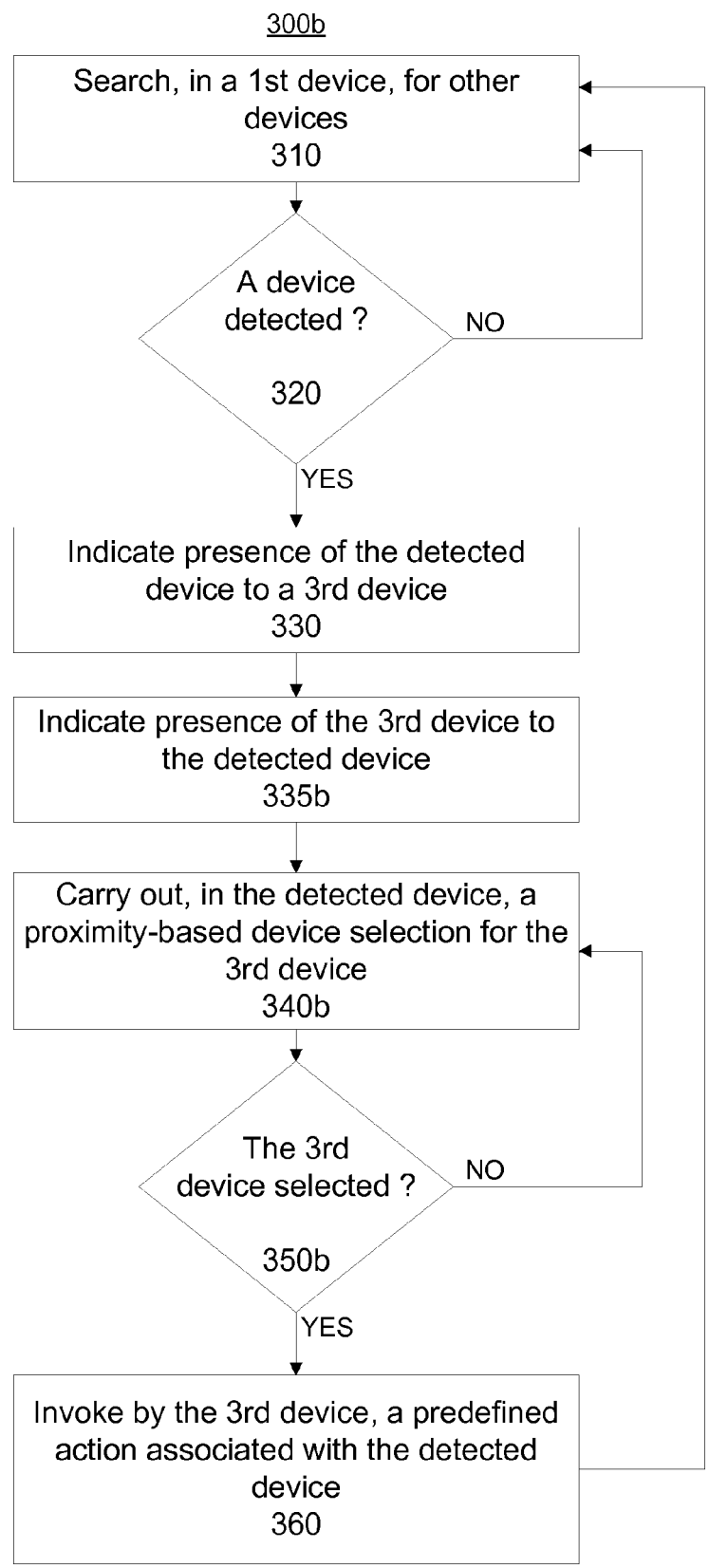
FIG. 4 illustrates a method according to an example embodiment.

FIG. 4 illustrates a second exemplifying method 300b for invoking one or more predefined actions by the third device 150 in the framework of the communication arrangement 100.

In the method 300b the operations corresponding to blocks 310 to 330 are similar to those described in the foregoing in context of the corresponding blocks of the method 300a. In response to detecting, in the first device 110, a presence of the second device 130 (block 320), the method 300b further proceeds to the first device 110 indicating the presence of the third device 150 to the second device 130, as indicated in block 335b. The indication procedure comprises the first device 110 using the wireless communication apparatus of the wireless communication portion 112 to activate or establish a wireless connection with the respective wireless communication apparatus in the second device 130 and to transmit one or more further control messages to the second device 130 via this wireless connection. The one or more further control messages comprise a device identification of the third device 150 to facilitate efficient proximity-based device detection by the second device 130.

In response to the further control message(s), the second device 130 causes the wireless communication apparatus of the wireless communication portion 132 to initiate and carry out a proximity-based device selection for the third device 150, such as the T2S technique described in the foregoing, as indicated in block 340b (e.g. in a manner similar to that described in the foregoing for the third device 150).

Continuing with the description of the method 300b, the third device 150 causes, in response to the control message(s) received from the first device 110, a wireless communication apparatus of the wireless communication portion 152 to initiate and/or carry out one or more preparatory actions to facilitate the second device 130 carrying out the proximity-based device selection for the third device 150. The one or more preparatory actions may comprise the third device 150 causing the wireless communication apparatus of the wireless communication portion 152 to change from operating in the state/mode where it is not discoverable by other devices to the state/mode where it is discoverable by other devices. Alternatively or additionally, the one or more preparatory actions may comprise initiating transmission of one or more messages addressing the second device 130 to enable carrying out the proximity-based device selection procedure for the third device 150 in the second device 130.

In response to the proximity-based device selection in the second device 130 having resulted in selecting the third device 150 (block 350b), the third device 150 invokes one or more predefined actions associated with the second device 130 (block 360) and the method 300b returns to block 310. In other words, at least one of one or more predefined actions is invoked, where the invoked action(s) is/are selected in dependence of identity of the second device 130. The indication of the successful outcome of the device selection in the second device 130 may be conveyed to the third device e.g. by establishing the connection between the second device 130 and the third device 150 (thereby implying successful device selection in the second device 130) or by sending a suitable control message from the second device 130 to the third device 150 (without establishing the connection).

In context of the method 300b, the operations described in blocks 320 to 350b may be varied in a number of ways within the framework of the method 300b. As described for the method 300a in the foregoing, also the method 300b may involve screening the other devices on basis of identity indicated for the second device 130, e.g. in accordance with one of the following approaches.

- In block 320, the search comprises the first device 110 searching for any device. In the course of the search the first device 110 receives a device identification associated with the second device 130 (i.e. that of the device used herein as an example of the detected device), and the received device identification is included in the control message(s) transmitted from the first device 110. The third device 150 has device identifications of one or more predefined devices pre-stored therein and the third device 150 proceeds with causing the wireless communication apparatus of the wireless communication portion 152 to initiate the preparatory action(s) that serve to facilitate the second device 130 carrying out the proximity-based device selection for the third device 150 only in response to determining that the device identification received in the control message(s) from the first device 110 matches one of the pre-stored device identifications available in the third device 150.

In block 320, the search comprises the first device 110 searching for any device. The third device 150 has device identifications of one or more predefined devices pre-stored therein and the third device 150 allows connection with the second device 130 to be established (block 350) only in response to having determined that a device identification received in the course of the proximity-based device selection (block 340b) matches one of the pre-stored device identifications available in the third device 150.

The first device 110 has device identifications of one or more predefined devices pre-stored therein, and in block 320 the search comprises the first device 110 searching for one of the predefined devices. The first device 110 hence proceeds to indicate the second device 130 and the third device 150 regarding the presence of the other device 130, 150 only in response to having determined that a device identifier of the second device 130 received in the course of the search (block 310) matches one of the pre-stored device identifications available in the first device 110.

As an example, the first device 110 detecting the presence of the second device 130 (block 310) may involve the first device 110 causing a wireless communication apparatus of the wireless communication portion 112 to transmit (e.g. broadcast) one or more inquiry messages to discover the second device 130 and to receive one more inquiry response messages from the second device 130 in response. In parallel, the second device 130 causes a corresponding wireless communication apparatus of the wireless communication portion 132 to scan for the inquiry messages from other devices and to respond, in response to detecting one or more inquiry messages, by transmitting the one or more inquiry response messages including a device identification associated with the source of the inquiry response message(s). As a variation of this example, the roles may be reversed such that the second device 130 uses a wireless communication apparatus of the wireless communication portion 132 to transmit the inquiry message(s) and the first device 110 uses a corresponding wireless communication apparatus of the wireless communication portion 112 to scan for the inquiry messages and to respond with the inquiry response message(s).

The inquiry message(s) serve both as a query regarding presence of any devices of a desired mode (that may be indicated in the inquiry messages) and as a request for information related to connection establishment with a detected device, whereas the inquiry response message(s) carry the requested connection establishment information. The procedure that involves one device transmitting the inquiry message(s) and another device responding with the inquiry response message(s) may be referred to as an inquiry procedure. In case the first device 110 is transmitting the inquiry message(s), it may receive the device identification associated with the second device 130 in the inquiry response message(s) originating from the second device 130. In case the first device 110 is receiving the inquiry message(s) (and responding with inquiry response message(s)), it may receive the device identification associated with the second device 130 by other means, e.g. as a consequence of connection establishment that may follow the inquiry procedure with the second device 130.

In the framework of the BT BR/EDR protocol the above-described inquiry procedure may correspond to the wireless communication apparatus of one of the wireless communication portions 112, 132 carrying out the BT inquiry operation (that comprises sending one or more ID packets) and the corresponding wireless communication apparatus of the other wireless communication portion 112, 132 carrying out the BT inquiry scan operation (that comprises detecting the ID packets), followed by the BT inquiry response operation (that comprises sending one or more frequency hop synchronization (FHS) packets possibly followed by one or more extended inquiry response (EIR) packets to provide connection set-up information to the source of the ID packet(s)). Details of the BT inquiry operation, BT inquiry scan operation and the BT inquiry response operation are found e.g. in the Bluetooth Specification, vol. 2, Part B, Section 8.4.

As another example, the first device 110 detecting the presence of the second device 130 (block 310) may involve the first device 110 causing a wireless communication apparatus of the wireless communication portion 112 to transmit one or more page messages addressing the second device 130 and to receive one more page response messages from the second device 130 in response. In parallel, the second device 130 causes a corresponding wireless communication apparatus of the wireless communication portion 132 to scan for the page messages from other devices and to respond, in response to detecting one or more page messages, by transmitting the one or more page response messages addressing the source of the page message(s). As a variation of this example, the roles may be reversed such that the second device 130 uses a wireless communication apparatus of the wireless communication portion 132 to transmit the page message(s) and the first device 110 uses a corresponding wireless communication apparatus of the wireless communication portion 112 to scan for the page messages and to respond with the page response message(s).

The page message(s) serve as a request for connection establishment with a certain other device, whereas the page response message(s) serve as an indication that the certain other device is within a range that enables (short-range) wireless communication. The procedure that involves one device transmitting the page message(s) and another device responding with the page response message(s) may be referred to as a page procedure. In case the first device 110 is transmitting the page message(s), it implicitly has knowledge of the device identification associated with the second device 130 (since the page messages are addressing the second device 130). In case the first device 110 is receiving the page message(s) from the second device 130 (and responding with page response message(s)), it may receive the device identification associated with the second device 130 in the page message(s).

In the framework of the BT BR/EDR protocol this exchange of page and page response messages may correspond to the wireless communication apparatus of one of the wireless communication portions 112, 132 carrying out the BT page operation (that comprises sending one or more ID packets addressing the other device) and the corresponding wireless communication apparatus of the other wireless communication portion 112, 132 carrying out the BT page operation (that comprises detecting the ID packets addressed thereto), followed by the BT page response operation (that comprises sending a frequency hop synchronization (FHS) packet). Details of the BT page operation, BT page scan operation and the BT page response operation are found e.g. in the Bluetooth Specification, vol. 2, Part B, Section 8.3.

As a further example, the first device 110 detecting the presence of the second device 130 (block 310) may involve the second device 130 causing a wireless communication apparatus of the wireless communication portion 132 to transmit (e.g. broadcast) one or more advertising messages and to scan for and/or receive one or more advertising response messages from the first device 110. In parallel, the first device 110 causes a corresponding wireless communication apparatus of the wireless communication portion 112 to scan for the advertising messages from other devices and to (possibly) respond by transmitting the one or more advertising response messages addressing the source of the advertising message(s). As a variation of this example, the roles may be reversed such that the first device 110 uses a wireless communication apparatus of the wireless communication portion 112 to transmit the advertising message(s) and the second device 130 uses a corresponding wireless communication apparatus of the wireless communication portion 132 to scan for the advertising messages and to respond with the advertising response message(s).

The advertising message(s) serve to indicate the presence of a device transmitting them to other devices and hence to enable the other devices to discover the device. The advertising message(s) may further carry information related to one or more services available in the device transmitting the advertising message(s), whereas the advertising response message(s) may carry information related to connection establishment with the device transmitting the advertising response message(s). The procedure that involves one device transmitting the advertising message(s) and another device responding with the advertising response message(s) may be referred to as an advertising procedure. The first device 110 may receive the device identification associated with the second device in the advertising message(s) or in the advertising response message(s) originating from the second device 130.

In the framework of the BLE protocol this exchange of advertising and advertising response messages may correspond to the wireless communication apparatus of one of the wireless communication portions 112, 132 operating in the BLE advertising state (that comprise e.g. sending one or more ADV_IND, ADV_DIRECT_IND ADV_NONCON-N_IND or ADV_SCAN_IND packets) and the wireless communication apparatus of the other wireless communication portion 112, 132 operating in the BLE scanning state and possibly transmitting an advertising response packet for requesting further information (a SCAN_REQ packet) or for requesting a connection to be established (a CONNEC-T_REQ packet). Details of the BLE advertising state and the BLE scanning state are found e.g. in the Bluetooth Specification, vol. 6, Part B, Section 4.4.

As an example, the first device 110 indicating the presence of the second device 130 to the third device 150 (block 330) may involve carrying out a page procedure between these devices. In particular, the first device 110 may cause a wireless communication a wireless communication apparatus of the wireless communication portion 112 to transmit one or more page messages addressing the third device 150 in response to having detected the presence of the second device 130. In parallel, the third device 150 may cause a wireless communication apparatus of the wireless communication portion 152 to scan for the page messages from the first device 110 and to respond by transmitting one or more page response messages addressing the first device 110 in response to detecting one or more page messages originating from the first device 110. The page procedure may be followed by wireless connection establishment between the first device 110 and the third device 150 and provision of the one or more control messages that serve as an indication of presence of the second device 130.

As another example, the first device 110 indicating the presence of the second device 130 to the third device 150 (block 330) may involve carrying out the advertising procedure between these devices. In particular, the first device 110 may cause a wireless communication apparatus of the wireless communication portion 112 to transmit one or more advertising messages addressed to the third device 150 in response to detecting the presence of the second device 130, whereas the third device 150 may cause a corresponding wireless communication apparatus of the wireless communication portion 152 to scan for the advertising messages from the first device 110 and to (possibly) respond with one or more advertising response message(s). In this regard, the response from the third device 150 may include a connection request and the advertising procedure may be followed by wireless connection establishment between the first device 110 and the third device 150 and provision of the one or more control messages that serve as an indication of presence of the second device 130.

Figure 5:
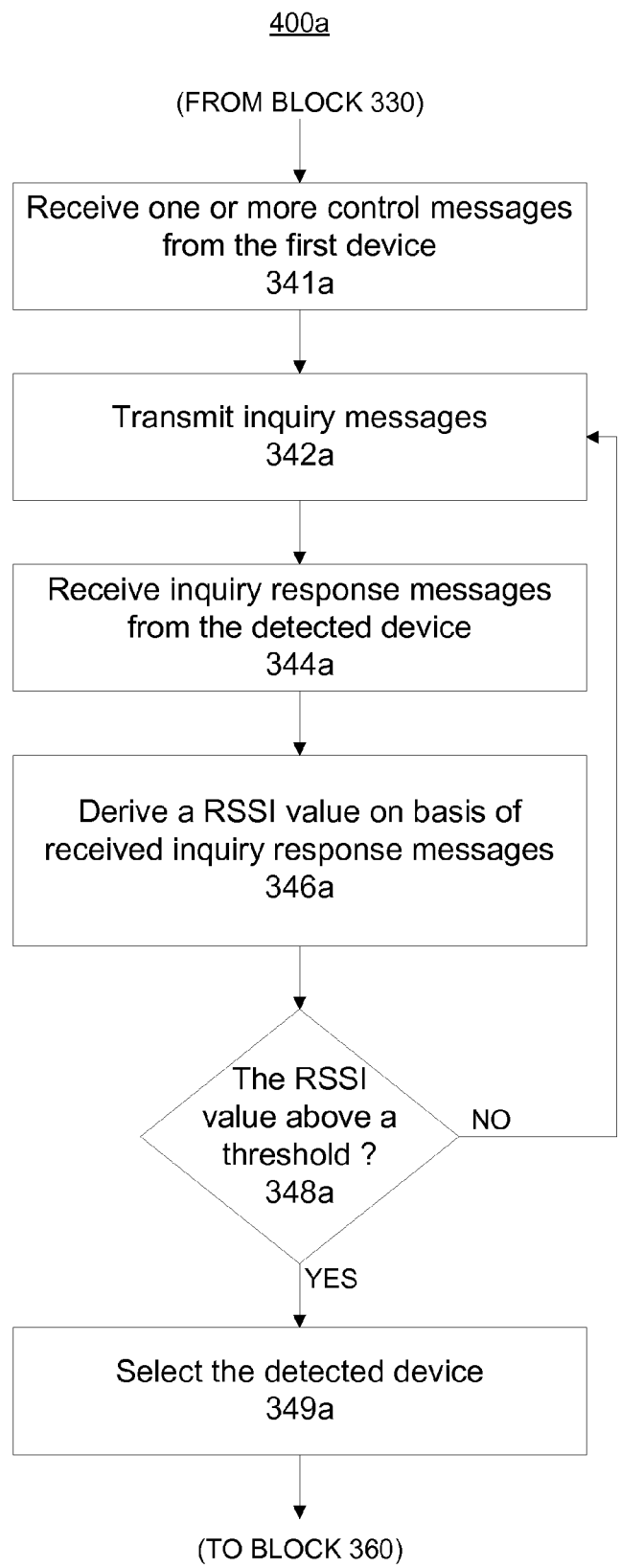
FIG. 5 illustrates a method according to an example embodiment.

FIG. 5 illustrates a method 400a, which may be carried out in the third device 150. The method 400a provides an example of operations that may be carried out in third device 150 in context of blocks 340a and 350a of the method 300a to provide the proximity-based device selection procedure for the second device 130 on basis of the inquiry and inquiry response messages (that are described in the foregoing) exchanged between the third device 150 and the second device 130. The method 400a commences by receiving the one or more control messages from the first device 110, as indicated in block 341a. These one or more control messages may comprise the one or more control messages transmitted from the first device 110 in order to indicate the presence of the second device 130 (block 330).

The method 400a further comprises the third device 150 causing a wireless communication apparatus of the wireless communication portion 152 to transmit one or more inquiry messages in order to receive respective inquiry response message(s) from the second device 130 (e.g. in accordance with the BT inquiry operation), as indicated in block 342a. In parallel, the second device 130 causes (or continues to cause) a corresponding wireless communication apparatus of the wireless communication portion 132 to scan for the inquiry messages and to respond with one or more inquiry response messages (e.g. in accordance with the BT inquiry response operation). The method 400a further comprises receiving the inquiry response messages transmitted from the second device 130, as indicated in block 344a.

The method 400a proceeds to determine whether the connection quality derivable on basis of the inquiry response messages received from the second device 130 indicate the second device 130 to be in close (enough) proximity of the third device 150. In this regard, the method 400a comprises the third device 150 causing the wireless communication apparatus to derive a RSSI value on basis of the RSSIs computed for one or more inquiry response messages received from the second device 130, as indicated in block 346a. As a few examples, the RSSI value may be derived as an average, as a median, as a minimum or as a maximum of the RSSIs computed for one or more received inquiry response messages.

The method 400a further comprises determining whether the computed RSSI value exceeds a predefined RSSI threshold, as indicated in block 348a. Consequently, the third device 150 may proceed with selecting the second device 130 in response to the RSSI value exceeding a predefined RSSI threshold (hence indicating the second device 130 to be in close enough proximity, e.g. to be within a touching range), as indicated in block 349a, whereas the third device 150 may refrain from selecting the second device 130 in response to the RSSI value failing to exceed the RSSI threshold (hence indicating the second device 130 not to be in close enough proximity, e.g. not to be within the touching range) and to continue processing from block 342a.

Figure 6:
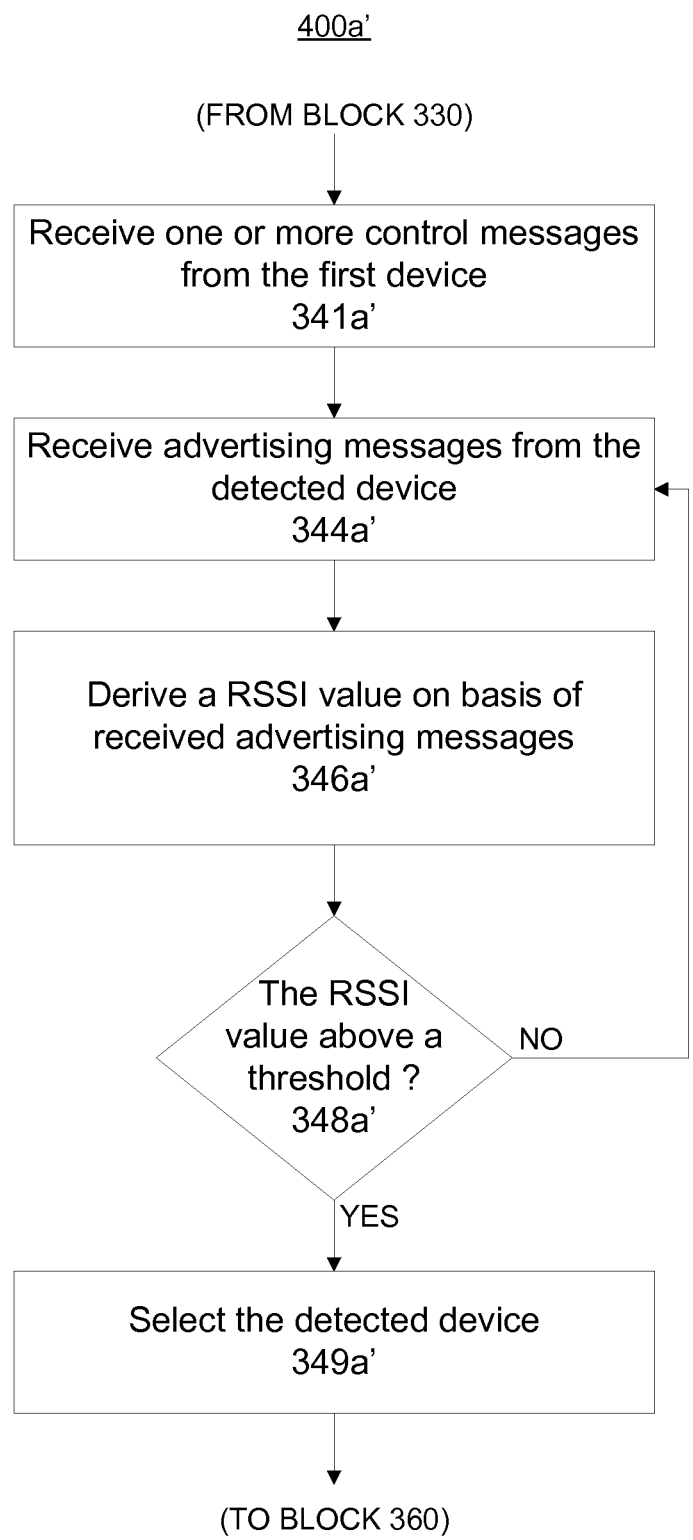
FIG. 6 illustrates a method according to an example embodiment.

FIG. 6 illustrates a method 400a', which may be carried out in the third device 150. The method 400a' provides an example of operations that may be carried out in third device 150 in context of blocks 340a and 350a of the method 300a to provide the proximity-based device selection procedure for the second device 130 on basis of the advertising and advertising response messages (that are described in the foregoing) exchanged between the third device 150 and the second device 130. The method 400a' commences by receiving the one or more control messages from the first device 110, as indicated in block 341a'.

The method 400a' further comprises the third device 150 causing a wireless communication apparatus of the wireless communication portion 152 to (scan for and) receive one or more advertising messages originating from the second device 130 (e.g. in accordance with the BLE scanning state), as indicated in block 344a'. In parallel, the second device 130 causes (or continues to cause) a corresponding wireless communication apparatus of the wireless communication portion 132 to transmit one or more advertising messages (e.g. in accordance with the BLE advertising state).

The method 400a' proceeds to determine whether the connection quality derivable on basis of the advertising messages received from the second device 130 indicate the second device 130 to be in close (enough) proximity of the third device 150. In this regard, the operations described in blocks 346a' to 349a' are similar to those of blocks 346a to 349a, respectively, with the exception that in context of the method 400a' the RSSI value is derived on basis the RSSIs computed for one or more advertising messages received from the second device 130.

In context of the methods 400a, 400a' the screening of connection attempts described in the foregoing may be provided e.g. by verifying the identity of the second device 130 as a condition for entering block 342a, 344a', e.g. by proceeding to carry out the operations described in the respective one of blocks 342a, 344a' only in response to having determined that the device identification of the second device 130 as received in the control message(s) from the first device 110 matches one of the pre-stored device identifications available in the third device 150. As another example of the screening of connection attempts in the methods 400a, 400a', the third device 150 may terminate the proximity-based device selection procedure in response to a device identification received in a message from the second device 130 as part of the operations described in block 344a, 344a' fails to match any of the pre-stored device identifications available in the third device 150.

Figure 7:
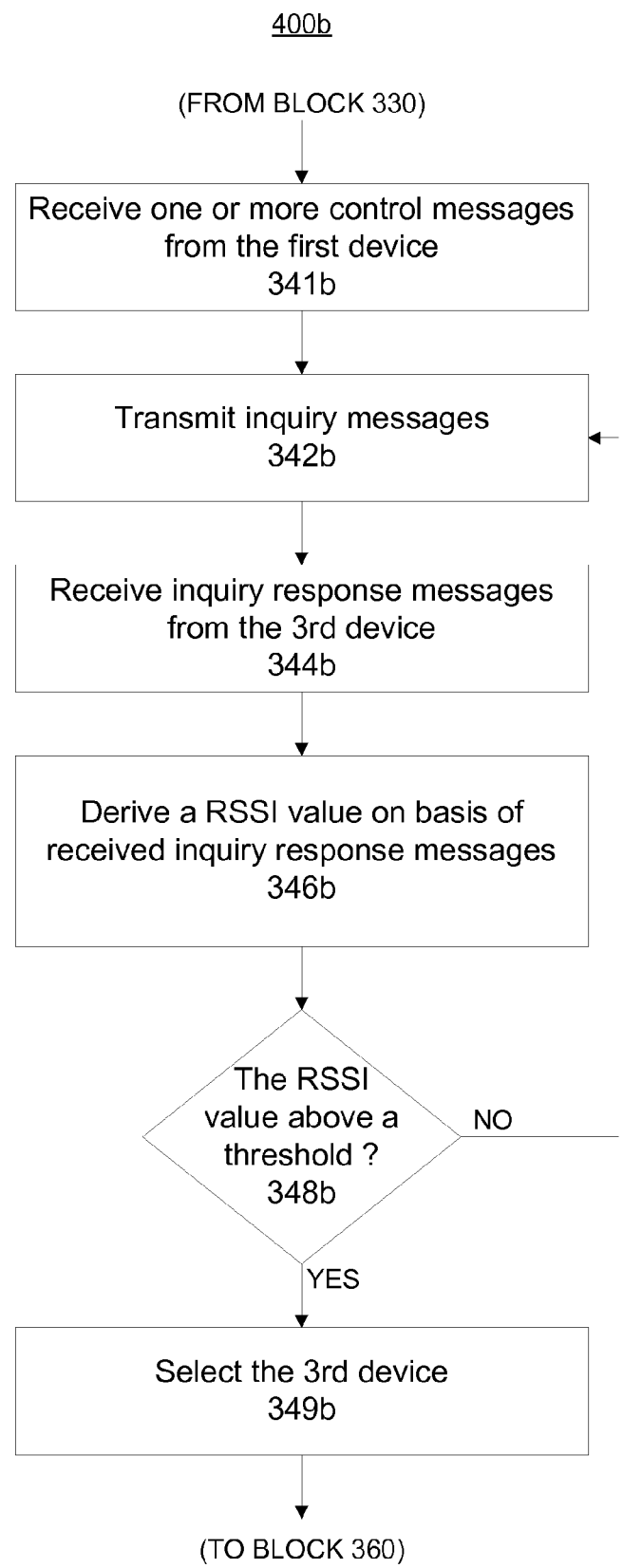
FIG. 7 illustrates a method according to an example embodiment.

FIG. 7 illustrates a method 400b, which may be carried out in the second device 130. The method 400b provides an example of operations that may be carried out in second device 130 in context of blocks 340b and 350b of the method 300b to provide the proximity-based device selection procedure for the third device 150 on basis of the inquiry and inquiry response messages (that are described in the foregoing) exchanged between the second device 130 and the third device 150. The method 400b commences by receiving the one or more control messages from the first device 110, as indicated in block 341b.

The method 400b further comprises the second device 130 causing a wireless communication apparatus of the wireless communication portion 132 to transmit one or more inquiry messages in order to receive respective inquiry response message(s) from the third device 150 (e.g. in accordance with the BT inquiry operation), as indicated in block 342b. In parallel, the second device 130 causes (or continues to cause) a corresponding wireless communication apparatus of the wireless communication portion 152 to scan for the inquiry messages and to respond with one or more inquiry response messages (e.g. in accordance with the BT inquiry response operation). The method 400b further comprises receiving the inquiry response messages transmitted from the third device 150, as indicated in block 344b.

The method 400b proceeds to determine whether the connection quality derivable on basis of the inquiry response messages received from the third device 150 indicate the third device 150 to be in close (enough) proximity of the second device 130. In this regard, the operations described in blocks 346b to 349b are similar to those of blocks 346a to 349a, respectively, with the exception that in context of the method 400b the roles are reversed such that the determination is carried out in the second device 130 and that the RSSI value is derived on basis the RSSIs computed for one or more inquiry response messages received from the third device 150.

Figure 8:
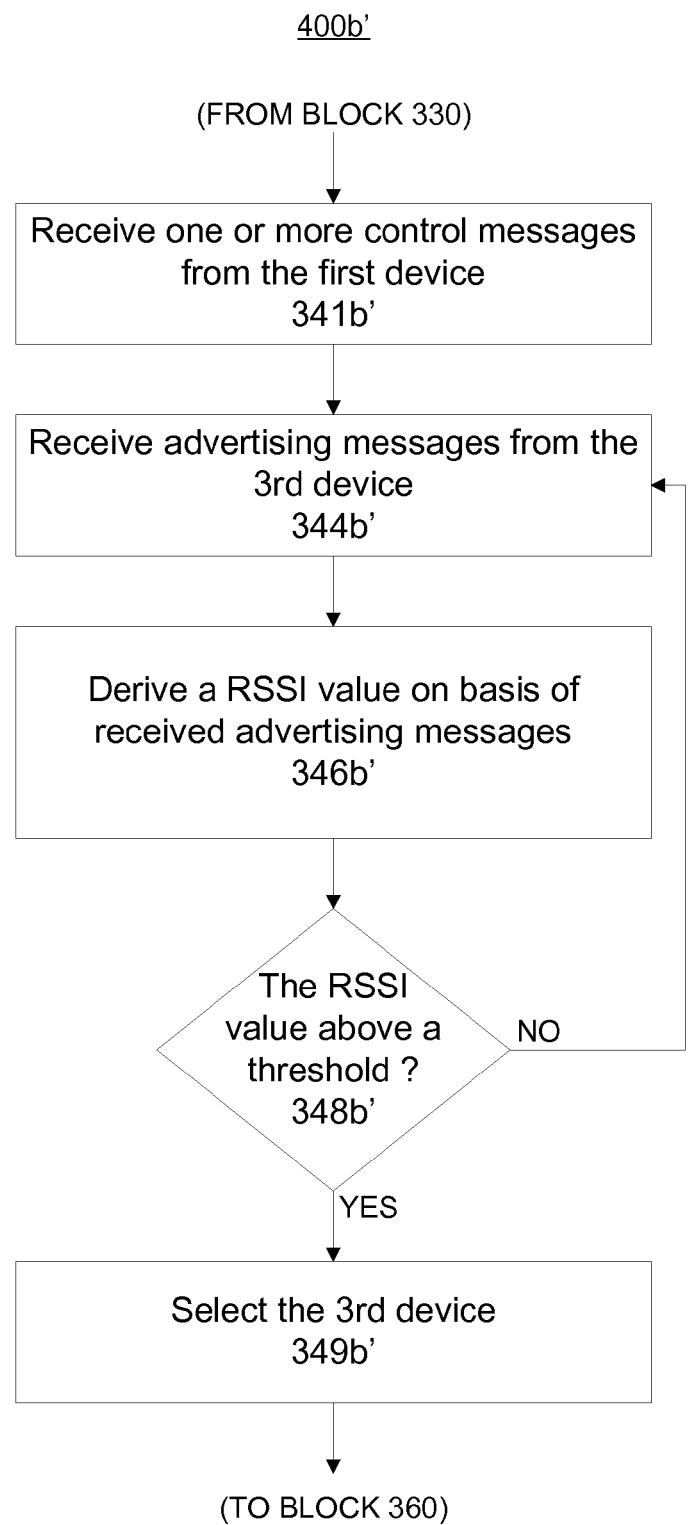
FIG. 8 illustrates a method according to an example embodiment.

FIG. 8 illustrates a method 400b', which may be carried out in the second device 130. The method 400b' provides an example of operations that may be carried out in second device 130 in context of blocks 340b and 350b of the method 300b to provide the proximity-based device selection procedure for the third device 150 on basis of the advertising and advertising response messages (that are described in the foregoing) exchanged between the second device 130 and the third device 150. The method 400b' commences by receiving the one or more control messages from the first device 110, as indicated in block 341b'.

The method 400b' further comprises the second device 130 causing a wireless communication apparatus of the wireless communication portion 132 to (scan for and) receive one or more advertising messages originating from the third device 150 (e.g. in accordance with the BLE scanning state), as indicated in block 344b'. In parallel, the third device 150 causes a corresponding wireless communication apparatus of the wireless communication portion 152 to transmit one or more advertising messages (e.g. in accordance with the BLE advertising state).

The method 400b proceeds to determine whether the connection quality derivable on basis of the messages received from the third device 150 indicate the third device 150 to be in close (enough) proximity of the second device 130. In this regard, the operations described in blocks 346b' to 349b' are similar to those of blocks 346a to 349a, respectively, with the exception that in context of the method 400b' the roles are reversed such that the determination is carried out in the second device 130 and that the RSSI value is derived on basis the RSSIs computed for one or more advertising messages received from the third device 150.

The device identification may comprise e.g. an address or other identifier assigned for the respective device. The device identifier may comprise e.g. a MAC address assigned to a wireless communication apparatus in the respective device 110, 130, 150 or other suitable address or identifier associated with the respective device 110, 130, 150. As an example, for the second device 130, the device identification may comprise the MAC address assigned for the wireless communication apparatus of the wireless communication portion 132 that is applied to transmit the respective message(s)—e.g. the inquiry response message(s), the page response message(s) or the advertising response messages in context of the first device 110 searching for the other devices (in block 310). Along similar lines, each of the pre-stored device identifications in the first device 110 or in the third device 150 may comprise the MAC address assigned to a wireless communication apparatus in a corresponding device or other suitable address or identifier associated with the corresponding device.

Referring back to block 360, in response to the proximity-based device selection procedure having resulted in one of the second device 130 and the third device 150 selecting the other device 130, 150, the third device 150 may be arranged to invoke the one or more predefined actions in dependence of the identity of the detected second device 130 involved in the detection procedure. In this regard, the third device 150 may store an information structure (e.g. a table or a database) that associates each of one or more predefined devices to one or more predefined actions associated thereto and may invoke the associated actions in response to successful device selection involving one of the predefined devices.

The third device 150 invoking a predefined action may comprise the third device 150 establishing a wireless connection with the second device 130, e.g. by using a wireless communication apparatus of the wireless communication portion 152 to establish a wireless connection with a respective wireless communication apparatus of the wireless communication portion 132, possibly followed by the third device 150 receiving data and/or control information from the second device 130 over the established wireless connection and/or the third device transmitting data and/or control information to the second device 130.

As another example, alternatively or additionally, invoking a predefined action may comprise controlling or operating one or more further devices in a manner that depends on the identity of the second device 130. Herein, controlling or operating a further device may comprise, for example, activating or deactivating the further device or a function provided by the further device. The further device(s) to be controlled or operated and the manner of controlling or operating may depend on the identity of the second device 130. As an example, controlling or operating the further device(s) may involve the third device 150 issuing one or more control signals to one or more further device(s) that are selected in dependence of the identity of the second device 130, where the action caused by the control signals is possibly also selected in dependence of the identity of the second device 130. The further device(s) may relate to, for example, control of access to or control of environmental characteristics of physical environment of the third device 150. An example in this regard includes the third device 150 controlling or operating one or more further devices that enable locking or unlocking one or more doors of a house or a building in vicinity of the third device 130, where the doors to be locked or unlocked depend in the identity of the second device 130. Another example in this regard involves operating a further device that enables switching lights in a room or in a building on or off, where the light fixtures to be switched on or off depend on the identity of the second device 130.

In the following, an application scenario that provides a concrete example of using the devices 110, 130 and 150 in the framework of the communication arrangement 100 to invoke one or more actions by the third device 150 is provided. In this example, the first device 110 is a communication device of a home automation/access control system that may be arranged to control various functions of a house, the first device 110 hence acting as a monitoring device. The second device 130 is a mobile user device of one of the residents of the house, and the third device 150 is a lock control device dedicated for controlling locks in the doors of the house.

The monitoring device is arranged to search for other devices in the proximity by transmitting page messages addressing one or more predefined devices. These predefined devices include the user devices of the residents of the house. At the same time, the lock control device is operated in the state/mode where it is not detectable by other devices. In case the monitoring device receives a paging response that carries a device identification of one of the residents' user devices, it will transmit a control message carrying the device identifier of the detected user device to the lock control device. In contrast, if the monitoring device receives a page response that carries a device identification that is not assigned to any of the residents' user devices, it will ignore the page response.

In response to receiving the control message, the lock control device starts transmitting page messages addressed to the detected user device. The lock control device further activates a proximity-based connection establishment procedure, including determination of the RSSI value on basis of the page response messages received from the detected user device. In case the RSSI value exceeds the predefined RSSI threshold, the lock control device proceeds considers the detected user device to be selected and invocation of predefined actions follows. In case the RSSI value fails to exceed the RSSI threshold, no actions are invoked and the lock control device may continue the page procedure until no longer receiving page response messages from the detected device.

The predefined actions include operating one or more further devices that are arranged to control opening or closing locks in the doors of the house in dependence of the device identification assigned for the selected user device. In case the user device of a parent or an adult of the family inhabiting the house is selected, the predefined actions include operating the further device(s) (e.g. by issuing respective control signal(s)) to lock or unlock all the doors of the house, whereas in case of the user device of a child is selected, the predefined action include only operating the further device(s) to lock or unlock the main door of the house may be issued.

Referring back to components of the first device 110, the second device 130 and the third device 150 described in the foregoing, the processor 116 is configured to read from and write to the memory 115, the processor 136 is configured to read from and write to the memory 135 and the processor 156 is configured to read from and write to the memory 155. Although the processor 116, 136, 156 is described as a single component, the processor 116, 136, 156 may be implemented as one or more separate components. Similarly, although the memory 115, 135, 155 is described as a single component, the memory 115, 135, 155 may be implemented as one or more separate components, some or all of which may be integrated/removable and/or may provide permanent/semi-permanent/dynamic/cached storage.

The memory 115 may store the computer program 117 comprising computer-executable instructions that control the operation of the apparatus 110 when loaded into the processor 116. As an example, the computer program 117 may include one or more sequences of one or more instructions. The computer program 117 may be provided as a computer program code. The processor 116 is able to load and execute the computer program 117 by reading the one or more sequences of one or more instructions included therein from the memory 115. The one or more sequences of one or more instructions may be configured to, when executed by the processor 116, cause the apparatus 110 to carry out operations, procedures and/or functions described in the foregoing in context of the first device 110. Hence, the apparatus 110 may comprise at least one processor 116 and at least one memory 115 including computer program code for one or more programs, the at least one memory 115 and the computer program code configured to, with the at least one processor 116, cause the apparatus 110 to perform operations, procedures and/or functions described in the foregoing in context of the first device 110. Similar considerations are equally valid for the corresponding components 13$x$ of the second device 130 and for the corresponding components 15$x$ of the third device 150.

Each of the computer programs 117, 137, 157 may be provided e.g. as a respective computer program product comprising at least one computer-readable non-transitory medium having program code stored thereon, the program code, when executed by the respective device or apparatus 110, 130, 150, causes the apparatus at least to perform operations, procedures and/or functions described in the foregoing in context of the respective device 110, 130, 150.

The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An apparatus for wireless communication, the apparatus comprising:
at least one processor; and
at least one memory including computer program code;
the at least one memory and the computer program code configured to, with the at least one processor, cause the apparatus to perform at least the following:
operate in a communication mode wherein the apparatus is configured to receive messages from other wireless communication devices while being undiscoverable by the other wireless communication devices;
initiate a proximity-based device selection for a second device in response to receiving, from a first device, one or more control messages that indicate presence of said second device within short-range communication coverage of the first device, wherein the proximity-based device selection comprises determining whether a received signal strength indication value derived from one or more messages received from said second device exceeds a predefined threshold that is indicative of the second device being in close proximity to the apparatus; and
invoke at least one predefined action in dependence of an identity of said second device in response to said proximity-based device selection having resulted in selecting said second device, wherein said second device is selected in response to having determined that said received signal strength indication value exceeds said predefined threshold.

2. The apparatus according to claim 1, wherein the at least one memory and the computer program code are configured to, with the at least one processor, cause the apparatus to proceed with the proximity-based device selection in response to said identity of said second device matching one of one or more predefined device identities.

3. The apparatus according to claim 2,
wherein at least one of said one or more control messages comprise a device identification of said second device; and
wherein the at least one memory and the computer program code are configured to, with the at least one processor, cause the apparatus to proceed with the proximity-based device selection in response to said device identification matching one of one or more pre-stored device identifications that are indicative of said one or more predefined identities.

4. The apparatus according to claim 1, wherein said messages received from said second device comprise information related to connection establishment with said second device.

5. The apparatus according to claim 4, wherein said one or more messages received from said second device comprise one of the following:
one or more inquiry response messages received from said second device in response to one or more inquiry messages transmitted from the apparatus, and
one or more advertising messages received from said second device.

6. The apparatus according to claim 5, wherein
said inquiry messages and inquiry response messages each comprise respective messages according to the Bluetooth Basic Rate/Enhanced Data Rate protocol, and
wherein said advertising messages comprise messages according to the Bluetooth Low Energy protocol.

7. The apparatus according to claim 1, wherein the at least one memory and the computer program code are further configured to, with the at least one processor, cause the apparatus to:
receive one or more page messages from the first device in a page scan state, and
establish wireless connection with the first device for reception of said one or more control messages in response to receiving one or more page messages from said first device.

8. The apparatus according to claim 1, wherein the at least one memory and the computer program code are further configured to, with the at least one processor, cause the apparatus to:

receive one or more advertising messages from the first device, and establish wireless connection with the first device for reception of said one or more control messages in response to receiving one or more advertising messages from said first device.

9. An apparatus according to claim 1, wherein said at least one predefined action comprises activating or deactivating one or more further devices in dependence of the identity of said second device.

10. A method for wireless communication, the method comprising:

operating, by an apparatus, in a communication mode wherein the apparatus is configured to receive messages from other wireless communication devices while being undiscoverable by the other wireless communication devices;

carrying out, by the apparatus, a proximity-based device selection for a second device in response to receiving, from a first device, one or more control messages that indicate presence of said second device within short-range communication coverage of the first device, wherein the proximity-based device selection comprises determining whether a received signal strength indication value derived from one or more messages received from said second device exceeds a predefined threshold that is indicative of the second device being in close proximity to the apparatus; and invoking, by the apparatus, at least one predefined action in dependence of an identity of said second device in response to said proximity-based device selection having resulted in selecting said second device, wherein said second device is selected in response to having determined that said received signal strength indication value exceeds said predefined threshold.

11. The method according to claim 10, further comprising proceeding, by the apparatus, with the proximity-based device selection in response to said identity of said second device matching one of one or more predefined device identities.

12. The method according to claim 10, wherein said one or more messages received from said second device comprise one of the following:

one or more inquiry response messages received from said second device in response to one or more inquiry messages transmitted from the apparatus, and one or more advertising messages received from said second device.

13. A computer program product comprising computer executable program code recorded on a non-transitory computer readable storage medium, the computer executable program code comprising:

code configured for operating, by an apparatus, in a communication mode wherein the apparatus is configured to receive messages from other wireless communication devices while being undiscoverable by the other wireless communication devices;

code configured for carrying out, by the apparatus, a proximity-based device selection for a second device in response to receiving, from a first device, one or more control messages that indicate presence of said second device within short-range communication coverage of the first device, wherein the proximity-based device selection comprises determining whether a received signal strength indication value derived from one or more messages received from said second device exceeds a predefined threshold that is indicative of the second device being in close proximity to the apparatus; and code configured for invoking, by the apparatus, at least one predefined action in dependence of an identity of said second device in response to said proximity-based device selection having resulted in selecting said second device, wherein said second device is selected in response to having determined that said received signal strength indication value exceeds said predefined threshold.

14. The computer program product according to claim 13, further comprising code configured for proceeding with the proximity-based device selection in response to said identity of said second device matching one of one or more predefined device identities.

* * * * *